United States Patent

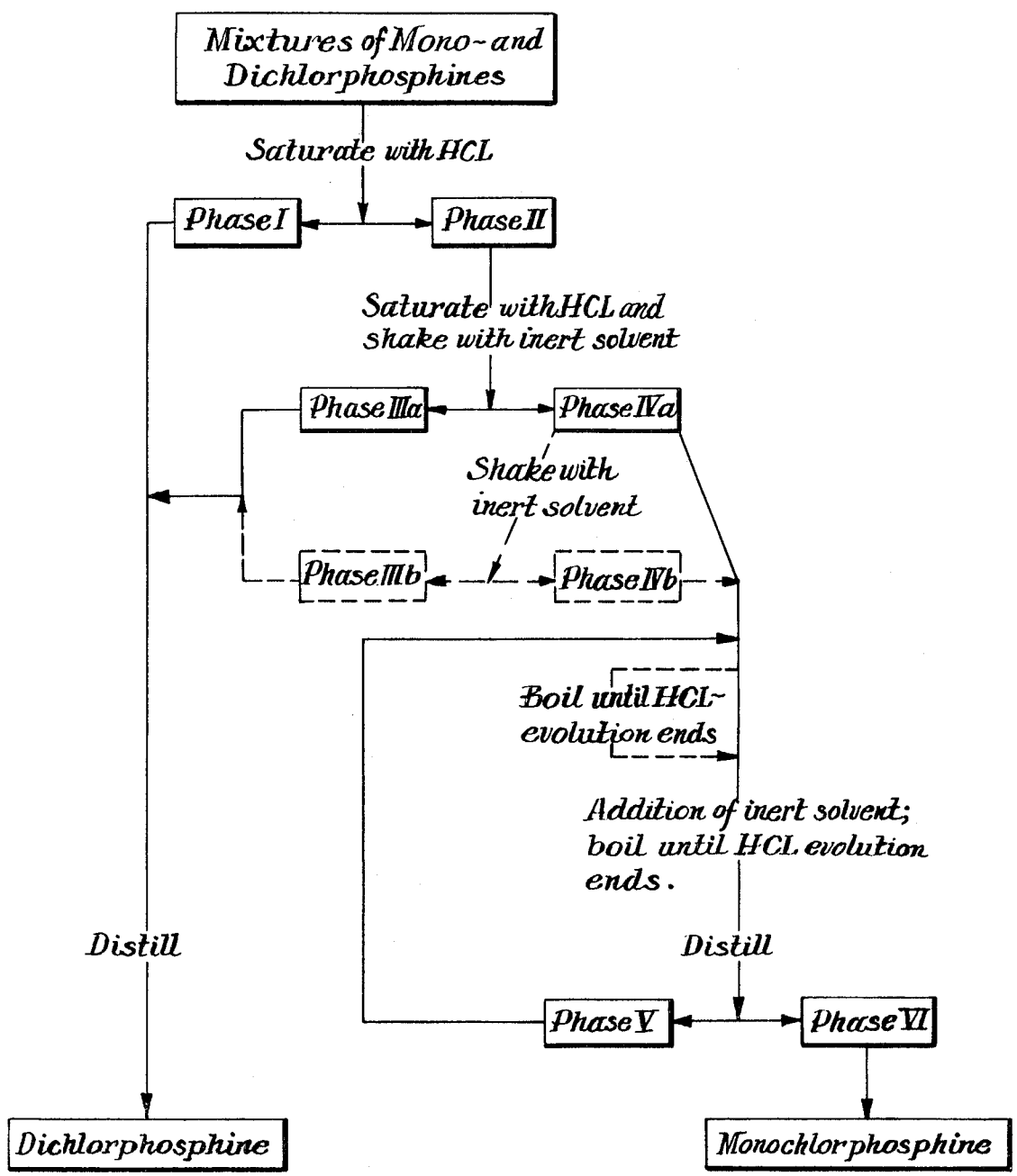

[11] 3,624,149

[72] Inventors Otto Bretschneider
Bonn;
Heinz Harnisch, Lovenich, near Cologne;
Werner Klose, Knapsack, near Cologne, all
of Germany
[21] Appl. No. 724,894
[22] Filed Apr. 29, 1968
[45] Patented Nov. 30, 1971
[73] Assignee Knapsack Aktiengesellschaft
Knapsack bei Cologne, Germany
[32] Priority May 11, 1967
[33] Germany
[31] K 62257

[54] PROCESS FOR SEPARATING ORGANIC CHLOROPHOSPHINES
5 Claims, 1 Drawing Fig.

[52] U.S. Cl. .................................................. 260/543 P
[51] Int. Cl. .................................................. C07f 9/52
[50] Field of Search .......................................... 260/543 P Primary Examiner—Lorraine A. Weinberger
Assistant Examiner—Edward Jay Gleiman
Attorney—Connolly and Hutz ABSTRACT: Separation of mixtures of organic monochlorophosphines and dichlorophosphines of the general formulas:

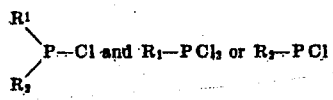

in which $R_1$ and $R_2$ being identical with or different from one another stand for alkyl radicals having one to three carbon atoms comprising saturating the mixtures with gaseous hydrogen chloride, separating from one another the resulting two liquid phases, which include a specifically lighter phase-I and a specifically heavier phase-II, the phase-I containing substantially the dichlorophosphine and the phase-II containing substantially the monochlorophosphine, isolating the dichlorophosphine from the phase-I, and isolating the monochlorophosphine from the phase-II.

PROCESS FOR SEPARATING ORGANIC CHLOROPHOSPHINES

The present invention relates to a process for separating mixtures consisting of organic mono- and dichlorophosphines of the general formulas:

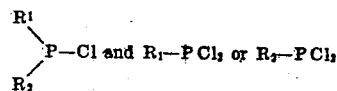

in which $R_1$ and $R_2$ being identical with or different from one another stand for alkyl radicals having one to three carbon atoms.

The above dialkyl monochlorophosphines and monoalkyl dichlorophosphines are often found to have boiling points so close to each other that distillative separation is impossible. For example, the two corresponding methyl compounds boil at temperatures of 81° and 84° C., respectively. In addition thereto, the chlorophosphines are known to be very reactive compounds which react vigorously with metallic materials. Thus, it is also impossible to fractionate the aforesaid chloromethyl compounds, for example in a rotating tape column. The reason is that the rotating tape is a chrome-nickel alloy tape with which the chlorophosphine undergoes a vigorous reaction. Attempts have also been made to achieve the separation by means of fractional crystallization, again with no satisfactory result.

It has now unexpectedly been found that the monochlorophosphines' pronounced tendency readily to absorb gaseous hydrogen chloride opens the way to separating them from dichlorophosphines which practically absorb no hydrogen chloride.

The process of the present invention comprises more especially saturating the starting mixture with gaseous hydrogen chloride, separating from one another the resulting two liquid phases, which includes a specifically lighter phase-I and a specifically heavier phase-II, the phase-I containing substantially the dichlorophosphine and the phase-II containing substantially the monochlorophosphine, isolating the dichlorophosphine from the phase-I and isolating the monochlorophosphine from the phase-II, by distillation.

In order to obtain very pure monochlorophosphine, it is advantageous, prior to the distillation, to saturate the phase-II once again with gaseous hydrogen chloride and extract it later once or twice with an inert solvent. This results again in the formation of two different phase-IIa and IVa or IIIb and IVb. These are separated from each other. The specifically lighter phases IIIa and IIIb, which contain the solvent, can be distilled to isolate therefrom a further small proportion of dichlorophosphine. The specifically heavier phases-IVa or IVb are mixed again with the inert solvent and boiled until hydrogen chloride ceases to be evolved. Thereafter, the mixture is subjected to fractional distillation while obtaining again two liquid phases of different specific weight, which include a small proportion of a specifically heavier phase-V, which is rejected or combined in a later separating step with the phase IVa or IVb, and a specifically lighter phase-VI consisting substantially of pure monochlorophosphine.

It is also possible first to boil the phase-IVa or IVb until HCl ceases to be evolved, then to add the inert solvent and again to boil the whole until hydrogen chloride again ceases to be evolved.

The useful inert solvents include, for example, aromatic, aliphatic or cycloaliphatic hydrocarbons or halogenated hydrocarbons, which are miscible with dichlorophosphine in any desired ratio but which do not dissolve the HCl-addition product of the monochlorophosphine, such as toluene, xylene, cumene, heavy gasoline, decaline and chlorobenzene. It is highly interesting to use inert solvents with a boiling point differing from that of the higher-boiling chlorophosphine by more than 10° C.

The separation reaction of the present invention is clearly illustrated in the accompanying diagrammatic representation.

EXAMPLE 1

The example was carried out using 321 grams of mixture comprising monomethyl dichlorophosphine and dimethyl monochlorophosphine, which had been produced, for example by reaction of methyl chloride with phosphorus in vapor form in contact with hydrogen chloride, and which still contained some HCl. Through that mixture there was passed a stream of 20 liters/hr. gaseous HCl, at a cooling water temperature of about 13° C., until saturation was complete. Two liquids of different specific weight were obtained. After separation in a separating funnel, there were obtained 135 grams of a liquid of light specific weight (phase-I) which was fractionated at atmospheric pressure. The bulk of the condensate distilled over at a temperature between 81° and 82° C. and was found to be pure $CH_3PCl_2$. The specifically heavy liquid (phase-II) weighed 300 grams. It was mixed at a cooling water temperature of about 13° C. with 100 grams xylene and extracted; gaseous HCl had been passed simultaneously through the two liquid phases (phases-IIIa and IVa) to saturate the xylene. The isolated xylene fraction (phase-IIIa) of lighter specific weight was to weigh 118 grams; the heavier liquid (phase IVa) was recovered at a rate of only 282 grams. To separate residual dichlorophosphine from the monochlorophosphine, the heavy-weight liquid (phase-IVa) was extracted once again in the manner already described, using 50 grams fresh xylene, and the resulting two phases (phases-IIIb and IVb) were again separated from one another. After the second extraction step, there were obtained 52 grams of a lighter weight xylene fraction (phase-IIIb) and 280 grams of a heavier weight liquid (phase-IVb). The two xylene fractions (phases-IIIa and IIIb) were fractionated at atmospheric pressure at a temperature of 81° to 100° C. and gave a total of 48 grams pure $CH_3PCl_2$, which was combined with the product coming from phase-I. The phase-IVb was reflux-heated so as to keep it just boiling; a rather large amount of HCl escaped and the boiling point was found gradually to increase from about 30° to about 53° C. 150 grams xylene were added to the mixture at that temperature, and heating was continued until HCl ceased to be evolved; the boiling temperature of the liquid increased to 80° C. The whole was distilled under a pressure of 200 mm. mercury and the fraction boiling between 27° and 65° C. was collected. The distillate was separated into its two phases (phases-V and VI); there were obtained 10 grams of the specifically heavier weight phase-V and 106 grams of the lighter weight phase-VI. The latter phase was formed of practically pure $(CH_3)_2PCl$. The phase-V contained substantially the HCl-adduct of monochlorophosphine, which could be worked up in the same manner as the phase-IVb.

EXAMPLE 2

The conditions were the same as those used in example 1 save that 260 grams of phase-IVb, produced in the manner set forth in the preceding example, were mixed with 160 grams xylene and that the two liquids were reflux-heated until HCl ceased to be evolved; the boiling temperature was found to increase to 85° C. The following fractional distillation under a pressure of 200 mm. mercury at a temperature between 27° and 65° C. yielded a fraction containing 16 grams of the specifically heavier weight phase-V and 101 grams of the lighter weight phase-VI. The latter phase was comprised of practically pure $(CH_3)_2PCl$ and the specifically heavier weight phase-V consisted substantially of the HCl-adduct of monochlorophosphine, which could be worked up in the same manner as phase-IVb.

We claim:
1. A process for separating mixtures consisting of organic monochlorophosphines and dichlorophosphines of the general formulas:

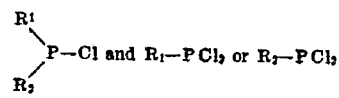

in which $R_1$ and $R_2$ being identical with or different from one another, stand for alkyl radicals having one to three carbon atoms, which comprises saturating the said mixtures with gaseous hydrogen chloride, producing by said saturation a lighter phase substantially comprising the dichlorophosphine component of said mixture, producing by said saturation a heavier phase substantially comprising the monochlorophosphine component of said mixture, separating said different density phases of the product from one another by use of separatory funnel decantation, isolating the dichlorophosphine from said phase by distillation, and isolating the monochlorophosphines from said phase by distillation.

2. The process as claimed in claim 1, wherein the heavier phase comprising essentially monochlorophosphine is treated further to extract residual dichlorophosphine therefrom, which comprises prior to the distillation saturating the heavier phase once again with gaseous hydrogen chloride, extracting the HCl-saturated heavier phase with an inert solvent selected from the group consisting of aromatic, aliphatic or cycloaliphatic hydrocarbons or halogenated hydrocarbons, which are miscible with the dichlorophosphine in any desired ratio but fail to dissolve the HCl-adduct of monochlorophosphine with the resultant production of a lighter phase substantially comprising residual dichlorophosphine with the inert solvent and a heavier phase consisting substantially of monochlorophosphine, separating said different density phases from one another by use of separatory funnel decantation, then extracting once more the heavier phase with further inert solvent with the further production of a heavier phase and a further lighter phase described above, then fractionating the combined two said lighter phases containing the solvent by fractional distillation at atmospheric pressure to isolate therefrom a further small proportion of dichlorophosphine and producing a substantially pure monochlorophosphine from the said heavier phase.

3. In the process as claimed in claim 2 mixing the resultant heavier phase together with the inert solvent and then boiling until hydrogen chloride ceases to be evolved, fractionally distilling to form a heavier phase substantially consisting of the HCl-adduct of monochlorophosphine and a lighter phase consisting of practically pure monochlorophosphine and separating said different density phase from one another by use of separatory funnel decantation.

4. In the process of claim 3 the further step wherein the heavier phase containing substantially the HCl-adduct of monochlorophosphine is returned and combined with the mixture containing the said inert solvent and then boiling the product obtained until hydrogen chloride ceases to be evolved.

5. The process of claim 2, wherein the inert solvent is a member selected from the group consisting of toluene, xylene, cumene, heavy gasoline, decalin or chlorobenzene.

* * * * *